UNITED STATES PATENT OFFICE 2,262,357

PROCESS FOR BREAKING PETROLEUM EMULSIONS

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Application June 27, 1940, Serial No. 342,716

9 Claims. (Cl. 252—341)

This invention relates primarily to the resolution of petroleum emulsions.

One object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipe-line oil.

We have discovered that the basic acylated derivatives of certain cyclic polyamines, and more especially, certain diamines, are particularly effective as demulsifiers for oil field emulsions. These acylated cyclic diamines are characterized by the presence of at least one basic amino nitrogen atom, i. e., an amino nitrogen atom which is not directly linked to an aryl radical, and which has not been acylated by the introduction of an acyl radical converting the same to an amide. Such compounds, by virtue of their basicity, combine readily with acids, such as the high molecular organic acids subsequently described, or with low molecular organic acids, such as acetic acid, butyric acid, and the like, or with mineral acids, such as sulfuric acid, hydrochloric acid, or the like, to form salts. The salts of the strong mineral acids or low molecular organic acids, for instance, the hydrochlorides, and comparable acetic acid derivatives, are usually water-soluble.

As has been stated, the compounds are characterized by having present at least one acyl radical derived from a high molecular weight carboxy acid. Insofar that one can form secondary amides, as well as primary amides (i. e., compounds where two acyl radicals are attached to the same amino nitrogen atom), it becomes obvious that one can introduce more than one acyl radical into a cyclic diamine, and still have present a basic amino nitrogen atom of the kind previously described. In the event a polyamine, having more than two amino nitrogen atoms, is employed, one can introduce at least two acyl radicals to form only primary amides. Furthermore, if the polyamine is hydroxylated, one can introduce two acyl radicals into a diamine (i. e., at the hydroxyl position as an ester form) and still leave the diamine basic.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alpha-hydroxy higher carboxylic, aliphatic and fatty acids, such as hydroxy stearic acid, dihydroxy-palmitic acid, dihydroxystearic acid, dihydroxybehenic acid, alphahydroxy capric acid, alpha-hydroxy stearic acid, alpha-hydroxy palmitic acid, alpha-hydroxy lauric acid, alpha-hydroxy myristic acid, alpha-hydroxy cocoanut oil mixed fatty acids, alpha-hydroxy margaric acid, alpha-hydroxy arachidic acid, and the like; fatty and similar acids derived from various waxes, such as beeswax, spermaceti, montan wax, japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy, diphenyl, naphthenic, and abietic acid; aralkyl and aromatic acids, such as benzoic acid, Twitchell fatty acids, naphthoic acid, carboxydiphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

In some instances, obviously certain derivatives of dibasic acids would in essence act as if they were simply monocarboxylated acids, for instance, various phthalamic acids derived from phthalic anhydride, and amines, such as aniline, cyclohexylamine, octylamine, etc. Other similar amido acids can be derived by means of other comparable anhydrides. One may also employ materials such as ethyl ricinoleate, monophthalate, etc., and also various acids which are derived from chloracetyl ricinoleic acid and its analogs, by replacing a chlorine atom with a suitable monovalent hydrocarbon or an oxyhydrocarbon radical.

Another source of suitable acids are those commonly referred to as lac acids, such for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chloro-, keto-, and amino- derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydride, the acyl chloride, or the like. In some instances, the esters, especially in presence of a trace or a significant amount of water, act as the acid itself, in that the acid is liberated. Unless specific reference is made to a particular isomer, one may employ any isomer or mixture of various isomers, if the acid or acids are so available.

Various well-known cyclic diamines will serve to produce compounds of the kind herein contemplated by acylation with a high molar carboxy acid of the kind described. As an example, one may employ omega-amino-N-ethylpiperidine of the formula:

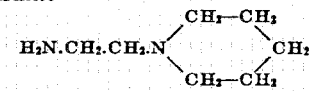

Other suitable compounds of the same type are obtainable by reacting amino alkyl chlorides with piperidine, as, for example, amino propyl chloride, amino butyl chloride, and the like. Another suitable class may be exemplified by dialicyclic alkylene diamines. Such compounds may be obtained in various manners, as, for example, by reactions involving cyclohexylamine and alkylene dichlorides or similar compounds which give divalent linking radicals, such as: $\beta\beta'$-dichlorodiethyl ether $(ClC_2H_4OC_2H_4Cl)$; $\beta$-chloroethoxy-$\beta'$-chlorodiethyl ether $(ClC_2H_4OC_2H_4OC_2H_4Cl)$ $\beta\beta'$-dichlordiisopropyl ether $(ClC_3H_7OC_3H_7Cl)$; gamma gamma' dichlorodipropyl ether $(ClC_3H_7OC_3H_7Cl)$ $\beta\beta'$-dichlorodiisobutyl ether $(ClC_4H_9OC_4H_9Cl)$; ethylene chloride; propylene chloride; butylene chloride; $\alpha\beta$-glycerol dichlorhydrin; -gamma-glycerol dichlorhydrin; methyl glycerol dichlorhydrin; polyglycerol dichlorhydrins; dichloroacetone

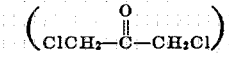

derived from acetone; dichloromethyl propyl ketone

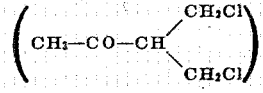

etc.

For additional examples, see U. S. Patent No. 2,126,620, dated August 9, 1938, to Clifford.

Another suitable compound in which the acyl radicals form part of the cycle, is exemplified by certain basic products derived from the amino ethers of high molar acids, particularly higher fatty acids. Reference is made to U. S. Patent No. 1,958,529, dated May 15, 1934, to Bockmühl and Knoll. Although said patent is concerned with derivatives of higher fatty acids, obviously one can substitute high molar carboxy acids of the kind previously described. In brief, such compounds are obtained by causing a salt of an imino ether of a higher fatty acid of the general formula:

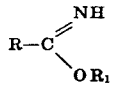

wherein R stands for an aliphatic hydrocarbon radical with at least 10 carbon atoms, and $R_1$ stands for alkyl, to react upon a diamino compound of the general formula:

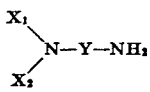

wherein $X_1$ and $X_2$ stand for hydrogen or alkyl, and Y for an aliphatic radical containing two or three carbon atoms, or a carbocyclic hydroaromatic radical containing the amino groups in ortho position. The acyl radical or acyl radical residue can be obtained from any high molecular weight carboxy acid of the kind described.

In such instances where such compounds have an amino hydrogen atom present, they may be further acylated as a rule without detracting from their basicity. However, even without further acylation, such compounds are entirely satisfactory and may be illustrated by the following formulas:

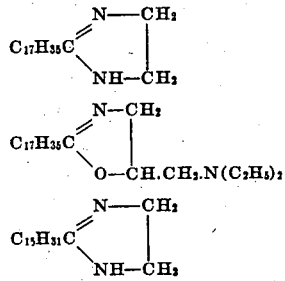

The manufacture of piperidine produces two by-products in substantially significant amounts, which may be suitably employed. One is the material known as dipiperidyl, which has the following composition:

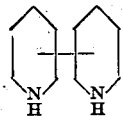

(Nuclear hydrogen atom not indicated)

The other is piperidyl pyridine:

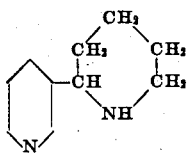

Another suitable class includes piperazine and piperazine homologus, i. e., materials derived by reacting alkylene dichlorides with ammonia.

See U. S. Patent No. 1,951,992, dated March 20, 1934, to Perkins. For instance, there is there disclosed the following two compounds:

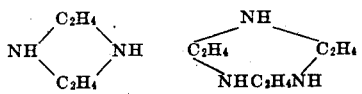

Cylic diethylene diamine    Cyclic triethylene triamine

It is to be noted, however, that a reaction of the kind just referred to involving, for example, ethylene dichloride and ammonia, may actually take place by virtue of the formation of an intermediate product, i. e., an amino alkyl chloride, which, in the case of ethylene dichloride, may be illustrated as follows:

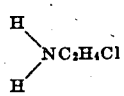

For instance, a somewhat similar compound, amyl chloramylamine, is described in U. S. Patent No. 2,014,077, dated September 10, 1935, to Wilson. Obviously, an amino alkyl chloride can react with a cyclic diamine, for instance, dicyclohexylamine or cyclohexylamylamine or the like, in the following manner:

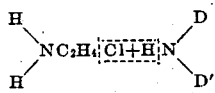

in which D represents a cyclic nucleus and D' may be the same, or may be different.

However, one is not limited to an amino alkyl chloride, because obviously compounds containing divalent linking radicals of the type previously described may be treated with ammonia so as to give an analog of the amino alkyl chloride, which may be indicated by the following formula:

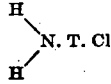

in which T represents the divalent linking radical previously described in connection with dichloro diethyl ether and various other kindred compounds, including glycerol dichlorhydrin. Such compound of the kind exemplified by

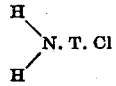

can react with numerous secondary cyclic diamines and even primary diamines to produce suitable cyclic diamines, which may be acylated to produce compounds of the type herein contemplated. For instance, such compound may be reacted with benzylamine, cyclohexylamine, dicyclohexylamine, and the like. Similarly, one can produce polyamines containing more than two amino nitrogen atoms by reacting such compounds with omega-amino-N-ethylpiperidine, which has been previously described, as well as with dicyclohexyl ethylene diamine, which is described in the aforementioned U. S. Patent No. 2,126,620.

Reactions of the kind previously described, i. e., involving a compound of the type:

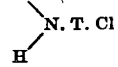

may involve an arylamine such as aniline. If a compound so obtained is acylated, then if the acyl radical replaces an amino hydrogen atom attached to the

radical previously described, one obtains an acylated diamine which is not basic, because neither the amino nitrogen atom nor the aryl nitrogen atom show basicity. If, however, acylation results in the replacement of an aryl amino nitrogen atom, then the resultant compound containing the radical:

is basic in character and may be employed. Actually, acylation reaction may produce types of acylated diamines, and such types may be separated from each other by solution in a strong acid, such as hydrochloric acid.

Also, as is well known, any of the diamines of the kind previously described containing at least one amino hydrogen atom may be converted into hydroxylated derivatives by reaction with an alkylene oxide, such as ethylene oxide, propylene oxide, glycidol, epichlorhydrin, and the like. As to the general procedure employed, although not concerned particularly with cyclic amines or the like, reference is made to U. S. Patent No. 2,046,720, dated July 7, 1936, to Bottoms.

In view of what has been said previously, it is unnecessary to indicate the method of producing the acylated compounds. Such compounds are obtained in the same manner that one obtains an acylated derivative of an ordinary noncyclic polyamine. In other words, the high molecular weight carboxy acid or its equivalent, such as the anhydride or acyl chloride, is simply heated with the elimination of water or the equivalent compound, with the formation of an amide; or if the amine is hydroxylated and contains no amino hydrogen atom, then acylation is obtained by means of an esterification reaction, i. e., a reaction involving an alcoholiform hydroxyl, which in turn, is attached to an amino nitrogen atom. Some compounds may contain both reactive amino hydrogen atoms and reactive hydroxyl radicals. In such instances one may produce a mixture of esters and amides.

*Example 1*

Dicyclohexyl ethylene diamine is acylated with ricinoleic acid by admixture in equal molecular proportions and heating at approximately 160–180° C. until the salt first formed is converted into the amide.

*Example 2*

One mole of cyclic triethylene triamine, previously described, is acylated with one mole of oleic acid employing the same procedure as in Example 1 preceding.

*Example 3*

Omega-amino-N-ethylpiperdine and purified naphthenic acids derived from Gulf Coast crude oil are reacted in equal molar proportions at approximately 180–200° C. until an acylated derivative is obtained.

*Example 4*

A material having the following composition:

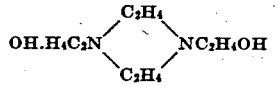

which is bis(hydroxyethyl)piperazine, is esterfied with two moles of ricinoleic acid.

*Example 5*

One mole of dipiperidyl, previously described, is acylated with one mole of abietic acid.

In the formation of some of the above amine compounds, it is well known, of course, that the elimination of hydrochloric acid reacts with any amine present to form a hydrochloride; and the hydrochloride so formed must be eliminated by means of caustic soda or the like to liberate the base or the amine. For the sake of brevity, this step has not been described in detail; but wherever such procedure is required, it should be obvious to one skilled in the art.

Attention is also directed to the fact that two types of compounds described, to wit, cyclic imido ethers and cyclic amidines, do not have the acyl group present unless in the latter instance the cyclic amidine can be acylated without decomposition. However, these compounds bear the same relationship to acyl-containing compounds as in the case of numerous other organic compounds where an oxygen atom has been replaced by an imino radical. For convenience, then, in these two types of compounds, i. e., cyclic imido ethers and cyclic amidines, the grouping:

is included within the broadened definition of acyl, so that it may be considered as an acyl radical; and this is also an instance where the "acyl" radical contributes part of the cyclic structure. Reference to the examples will show that they are diamines, and otherwise are properly included.

It may be well to emphasize that all the polyamines employed must contain at least one basic amino nitrogen atom, i. e., an amino nitrogen atom not directly linked to an aryl radical and not acylated. Such amino nitrogen atom may, however, be joined to an acyl radical by an intervening carbon atom chain or the equivalent, i. e., the acyl radical may be introduced in the form of an ester linkage without converting the amino nitrogen atom to a non-basic form. Needless to say, the amines described may be used "as is," or in the form of salts or in any other suitable form, such as the base form obtained by combination with water.

As has been previously stated, our preference is to use a detergent-forming acid, particularly a fatty acid, and more specifically, ricinoleic acid, or at least, a hydroxylated fatty acid, to furnish the acyl radical. More specifically, we prefer to use a diamine, rather than a polyamine having more than two amino nitrogen atoms; and more specifically, our preference is a piperazine type of material, such as those which have been previously described.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It is to be noted that none of the compounds above described contain a quaternary ammonium radical; and compounds of the type herein contemplated are characterized by freedom from quaternary ammonium radicals.

Having thus described our invention, what we claim as new and desire to secure by Letters Patent is:

1. A process for resolving petroleum emulsions of the water-in-oil type, characterized by subjecting the emulsion to the action of a demulsifier comprising a product of the kind derivable by an acylation reaction between: first, a high molecular weight monocarboxy acid having more than six carbon atoms and less than 40 carbon atoms; and second, a cyclic polyamine selected from the class consisting of members characterized by the presence of at least one of the following radicals: arylamine radicals, hydroaromatic amine radicals, dipiperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom and freedom from quaternary ammonium radicals.

2. A process for resolving petroleum emulsions of the water-in-oil type, characterized by subjecting the emulsion to the action of a demulsifier comprising a product of the kind derivable by an acylation reaction between: first, a detergent-forming acid having at least six carbon atoms and less than 40 carbon atoms; and second, a cyclic polyamine selected from the class consisting of members characterized by the presence of at least one of the following radicals: arylamine radicals, hydroaromatic amine radicals, dipiperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom and freedom from quarternary ammonium radicals.

3. A process for resolving petroleum emulsions of the water-in-oil type, characterized by subjecting the emulsion to the action of a demulsifier comprising a product of the kind derivable by an acylation reaction between: first, a fatty acid having at least eight carbon atoms and less than 40 carbon atoms; and second, a cyclic polyamine selected from the class consisting of members characterized by the presence of at least one of the following radicals: arylamine radicals, hydroaromatic amine radicals, dipiperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom and freedom from quaternary ammonium radicals.

4. A process for resolving petroleum emulsions of the water-in-oil type, characterized by subjecting the emulsion to the action of a demulsifier comprising a product of the kind derivable by an acylation reaction between: first, a fatty acid having at least eight carbon atoms and less than 22 carbon atoms; and second, a cyclic polyamine selected from the class consisting of members characterized by the presence of at least one of the following radicals: Arylamine radicals, hydroaromatic amine radicals, di-piperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom, and freedom from quaternary ammonium radicals.

5. A process for resolving petroleum emulsions of the water-in-oil type, characterized by subjecting the emulsion to the action of a demulsifier comprising a product of the kind derivable by an acylation reaction between: first, an unsaturated fatty acid having at least eight carbon atoms and less than 22 carbon atoms; and second, a cyclic polyamine selected from the class consisting of members characterized by the presence of at least one of the following radicals: Arylamine radicals, hydroaromatic amine radicals, dipiperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom, and freedom from quaternary ammonium radicals.

6. A process for resolving petroleum emulsions of the water-in-oil type, characterized by subjecting the emulsion to the action of a demulsifier comprising a product of the kind derivable by an acylation reaction between: first, ricinoleic acid; and second, a cyclic polyamine selected from the class consisting of members characterized by the presence of at least one of the following radicals: Arylamine radicals, hydroaromatic amine radicals, dipiperidyl radicals, piperidyl pyridine radicals, piperazine radicals, piperidine radicals, pyridine radicals, cyclic imido ether radicals, cyclic amidine radicals, and cyclic triethylene triamine radicals; said acylated derivative being characterized by the presence of at least one basic amino nitrogen atom, and freedom from quaternary ammonium radicals.

7. A process for resolving petroleum emulsions of the water-in-oil type, characterized by subjecting the emulsion to the action of a demulsifier comprising a product of the kind derivable by an acylation reaction between: first, ricinoleic acid; and second, a cyclic polyamine containing a piperazine radical; said acylated derivative being characterized by the presence of at least one basic amino nitrogen atom, and freedom from quaternary ammonium radicals.

8. A process for resolving petroleum emulsions of the water-in-oil type, characterized by subjecting the emulsion to the action of a demulsifier comprising a product of the kind derivable by an acylation reaction between: first, ricinoleic acid; and second, a cyclic polyamine containing a cyclic imido ether radical; said acylated derivative being characterized by the presence of at least one basic amino nitrogen atom, and freedom from quaternary ammonium radicals.

9. A process for resolving petroleum emulsions of the water-in-oil type, characterized by subjecting the emulsion to the action of a demulsifier comprising a product of the kind derivable by an acylation reaction between: first, ricinoleic acid; and second, a cyclic polyamine containing a cyclic amidine radical; said acylated derivative being characterized by the presence of at least one basic amino nitrogen atom, and freedom from any quaternary ammonium radicals.

MELVIN DE GROOTE.
BERNHARD KEISER.
CHARLES M. BLAIR, Jr.